United States Patent
Wang (10) Patent No.: US 11,134,035 B2
(45) Date of Patent: Sep. 28, 2021

(54) METHOD AND DEVICE FOR SECURELY SENDING MESSAGE

(71) Applicant: Beijing Xiaomi Mobile Software Co., Ltd., Beijing (CN)

(72) Inventor: Ke Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 130 days.

(21) Appl. No.: 15/937,811

(22) Filed: Mar. 27, 2018

(65) Prior Publication Data

US 2018/0309701 A1 Oct. 25, 2018

(30) Foreign Application Priority Data

Apr. 25, 2017 (CN) .......................... 201710277104.0

(51) Int. Cl.
  *H04L 12/58* (2006.01)
  *H04L 29/08* (2006.01)

(52) U.S. Cl.
  CPC .............. *H04L 51/04* (2013.01); *H04L 51/12* (2013.01); *H04L 51/32* (2013.01); *H04L 67/1044* (2013.01); *H04L 51/14* (2013.01)

(58) Field of Classification Search
  CPC ......... H04L 51/04; H04L 51/12; H04L 51/32; H04L 67/1044
  USPC ....................................................... 709/206
  See application file for complete search history.

(56) References Cited

U.S. PATENT DOCUMENTS

| 7,092,992 B1* | 8/2006 | Yu ........................... H04L 51/12 709/206 |
| 8,825,773 B1 | 9/2014 | Gauvin |
| 2007/0011235 A1* | 1/2007 | Mutikainen ........... H04L 67/306 709/204 |
| 2007/0192474 A1* | 8/2007 | Decasper .............. H04L 67/306 709/223 |
| 2008/0220872 A1* | 9/2008 | Midgley ................. A63F 13/12 463/42 |
| 2010/0005402 A1* | 1/2010 | George ................... H04L 51/04 715/758 |
| 2011/0151890 A1* | 6/2011 | Platt ..................... G06Q 10/107 455/456.1 |

(Continued)

FOREIGN PATENT DOCUMENTS

| CN | 1992684 A | 7/2007 |
| CN | 104753760 A | 7/2015 |

(Continued)

OTHER PUBLICATIONS

European Extended Search Report issued in corresponding EP Patent Application No. 18164273.7, dated Sep. 21, 2018, 8 pages.

(Continued)

*Primary Examiner* — Meng Vang
(74) *Attorney, Agent, or Firm* — Arch & Lake LLP (57) ABSTRACT

The present disclosure relates to a method and a device for securely sending a message. The method for securely sending a message includes: receiving a new message; determining the user group to which the new message is to be sent according to the identification of the user group; and sending the new message to the group members in the user group except the target group member after determining that the new message is related to a shielded user of the target group member.

12 Claims, 5 Drawing Sheets

(56) References Cited

U.S. PATENT DOCUMENTS

| | | | |
|---|---|---|---|
| 2012/0102410 A1* | 4/2012 | Gewecke | G06F 16/435 |
| | | | 715/738 |
| 2013/0282835 A1 | 10/2013 | Bates | |
| 2015/0127526 A1* | 5/2015 | Ye | G06Q 20/10 |
| | | | 705/39 |
| 2015/0163182 A1* | 6/2015 | Chandrasekaran | H04L 51/063 |
| | | | 709/204 |
| 2015/0222617 A1 | 8/2015 | Ebersman | |
| 2015/0370798 A1 | 12/2015 | Ju | |
| 2016/0182419 A1 | 6/2016 | Albouyeh | |
| 2016/0337293 A1* | 11/2016 | Koum | H04L 67/306 |

FOREIGN PATENT DOCUMENTS

| | | |
|---|---|---|
| CN | 105704016 A | 6/2016 |
| CN | 106161203 A | 11/2016 |
| CN | 106506321 A | 3/2017 |
| WO | 2013053317 A1 | 4/2013 |

OTHER PUBLICATIONS

First Office Action issued in Chinese Application No. 201710277104.0 dated Sep. 23, 2019 and English translation (12p).

* cited by examiner

METHOD AND DEVICE FOR SECURELY SENDING MESSAGE

CROSS-REFERENCE TO RELATED APPLICATIONS

This application is based upon and claims priority to Chinese Patent Application No. 201710277104.0, filed on Apr. 25, 2017, the entire contents thereof are incorporated herein by reference for all purposes.

TECHNICAL FIELD

The present disclosure generally relates to the field of electronic communication technology, and more particularly, to a method and a device for securely sending a message.

BACKGROUND

With development of communication technology, many users utilize the social network to communicate to one another. The Social Network Service (SNS) may provide SNS service through applications (APP) and networks to users. In a SNS center, a user may set his favored user as a closely-followed user, and may shield a disfavored user. In many SNS networks, for example, after a User A shields User B, the User B cannot send a message privately to the User A, and the User A cannot see dynamic messages published by the User B. However, if the User A and the User B are in the same chatting group or in the same user group, the User A can still see the message sent by the User B in the chatting group or the user group. In this case, the User A cannot completely shield the User B, the security of the sent message may be compromised and the user experience may be affected.

SUMMARY

The present disclosure discloses a method, a device and a non-transitory computer-readable storage medium for securely sending a message.

According to a first aspect of the present disclosure, a method for securely sending a message is provided. The method may include receiving a new message, the new message carrying an identification of a user group to which the new message is to be sent; determining the user group to which the new message is to be sent according to the identification of the user group, where the user group may include at least two group members who are different from a sending party of the new message, and a target group member may be included in the at least two group members; and sending the new message to the group members in the user group except the target group member after determining that the new message is related to a shielded user of the target group member.

According to a second aspect of the present disclosure, a device for securely sending a message is provided. The device may include: a processor; and a memory for storing instructions executable by the processor, wherein the processor is configured to: receive a new message, where the new message carries an identification of a user group to which the new message is to be sent; determine the user group to which the new message is to be sent according to the identification of the user group, where the user group may include at least two group members who are different from a sending party of the new message, and a target group member may be included in the at least two group members; and send the new message to other group members in the user group except the target group member after determining that the new message is related to a shielded user of the target group member.

According to a third aspect of the present disclosure, a non-transitory computer-readable storage medium having stored therein instructions for securely sending a message is provided. The instructions, when executed by a processor of a device, may cause the device to: receive a new message, where the new message carries an identification of a user group to which the new message is to be sent; determine the user group to which the new message is to be sent according to the identification of the user group, where the user group may include at least two group members who are different from a sending party of the new message, and a target group member may be included in the at least two group members; and send the new message to the group members in the user group except the target group member after determining that the new message is related to a shielded user of the target group member.

It is to be understood that both the foregoing general description and the following detailed description are exemplary only and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

DETAILED DESCRIPTION

Reference will now be made in detail to examples, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the disclosure. Instead, they are merely examples of apparatuses and methods consistent with aspects related to the disclosure as recited in the appended claims.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

In many social networks or social APPs, a user may set his favored user as a closely-followed user, and set a disfavored user as a shielded user. However, in some application scenarios, it is not possible for the user to completely shield another user. For example, in one application scenario, after User A shields User B, the User B cannot send a message privately to the User A, and the User A cannot see dynamic messages published by the User B. However, if the User A and the User B are in the same chatting group or in the same user group, the User A can still see the message sent by the User B in the chatting group or the user group. In another application scenario, for example, after the User A shields the User B, the User A will not receive the messages sent by User B. However, if User C is in the same chatting group or a user group with the User A and User B, the User A still can see a message sent by the User C to the User B, or a message regarding the User B sent by the User C, thus affecting the user experience.

In the technical solution provided by the example of the present disclosure, a new message is received from a sending party of the new message. A user group to which the new message is to be sent is determined according to the new message, the user group includes a target group member and at least one other group member. When it is determined that the new message is related to a shielded user of the target group member, the new message is sent to other group members in the user group except the target group member. When a new message is received from a sending party of the new message, if it is determined that the new message is related to a shielded user of the target group member, the new message is not sent to the target group member, even though the new message is a group message. In this way, it may ensure that the target group member won't receive a group message related to a user shielded by the target group member, thus improving user experience.

Figure 1:
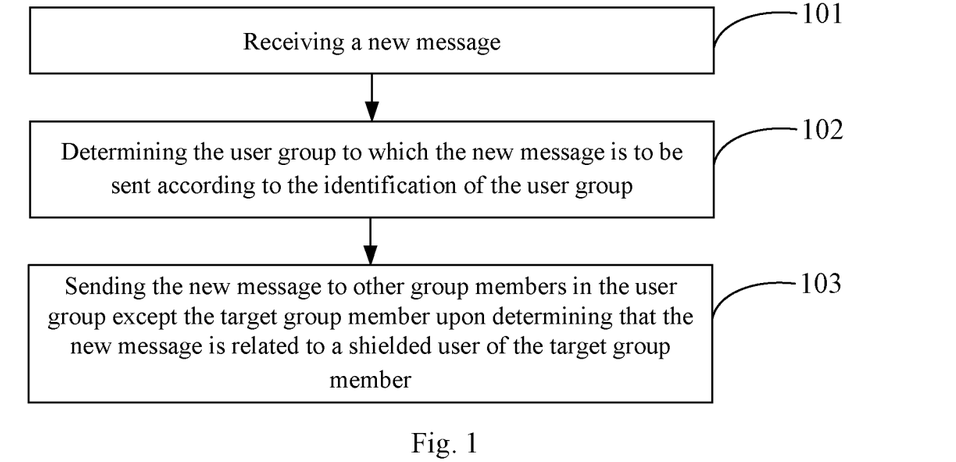
FIG. 1 is a flow chart illustrating a method for sending a message according to an example.

FIG. 1 is a flow chart illustrating a method for sending a message according to an example. As shown in FIG. 1, the method for sending a message includes steps 101-103.

At step 101, a new message is received.

The new message carries an identification of a user group to which the new message will be sent.

It should be noted that, in the solution provided by the present disclosure, sending and receiving of a new message to and from a sending party and a target user group member are all performed by a device which the user logs on, such as a smart mobile phone, a tablet computer, a desktop computer, a notebook computer or other terminal devices. For example, a sending party of a new message logs on a smart mobile phone, and sending of the new message is implemented by the smart mobile phone.

At step 102, a user group to which the new message is to be sent is determined according to the identification of the user group.

A user group includes at least two group members apart from the sending party of the new message, and the at least two group members includes a target group member. The user group may be referred with different terms, such as a chatting group, a group or a friend group, which is not limited by the present disclosure.

At step 103, when it is determined that the new message is related to a shielded user of a target group member, the new message is sent to other group members in the user group except the target group member.

The new message being related to a shielded user of a target group member, may refer to the situation when the new message is sent from the shielded user of the target group member, or the situation when the content of the new message is related to the shielded user of the target group member. Here, two application scenarios are provided as how to determine a new message is related to a shielded user of a target group member.

In a first application scenario, the method may also include: when a sending party of a new message is set by a target group member as a shielded user, it is determined that the new message is related to the shielded user of the target group member.

In the example, if the sending party of the new message is a shielded user of the target group member, the new message for sending is related to the shielded user of the target group member. In this way, it may ensure that the target group member won't receive the message sent by the shielded user of the target group member.

For example, when the sending party of the new message and the target group member are in the same chatting group, the sending party of the new message is sending a new message in the chatting group. The user group includes other group members than the sending party of the new message in the chatting group. At this time, if the sending party of the new message is the shielded user of the target group member, the new message is not sent to the target group member, but only to the group members other than the target group member in the user group. In this way, it may avoid the situation that the target group member still can receive a group message sent by a shielded user after the target group member sets to shield the user.

However, this is only an example, and the present disclosure is not limited thereto.

The target group member may selectively set whether to shield the new message sent by the shielded user in the user group. In one example, the method may also include: a shield prompt message is sent to the target group member, the shield prompt message for inquiring of the target group member about whether to shield the message of the sending party of the new message in the user group; a confirmation message is received from the target group member, the confirmation message for instructing that the target group member confirms that the message of the sending party of the new message is shielded in the user group.

In the example, from the prompt message, the target group member may be informed that the shielded user is sending a message in the group, and the target group member may selectively reject to receive the message.

In a second application scenario, the method may also include: the content of the new message is analyzed, and when it is determined that the content of the new message is related to a shielded user of the target group member based on the result of the analysis, it is determined that the new message is related to the shielded user of the target group member.

It should be noted that, analyzing the content of the new message may be performed when the sending party of the new message is not the shielded user of the target group member, and when the sending party of the new message is the shielded user of the target group member, it is not necessary to analyze the content of the new message, to reduce the work load. However, the content of the new message may be directly analyzed. For example, if the target group member is the User A, the sending party of the new message is the User B, and the User C is the shielded user of the User A. The user group may a part of a chatting group, or may be a temporary group formed by users to receive the new message. If a new message sent by the User B to the user group is @User C, or the new message sent by the User B to the user group is a reply to a message previously sent by the User C, or the new message sent by the User B to the user group is talking about the User C, these situations may all be deemed that the new message is related to the shielded user of the target group member. However, there are may be many other situations when the new message is related to the shielded user of the target group member. Here are only non-exhaustive examples, and the present disclosure is not limited thereto.

In the example, when the new message is related to the shielded user of the target group member, the new message are not sent to the target group member, and any group message related to the shielded user of the target group member may be completely shielded, thus, the security of the sent message is enhanced and the user experience is improved.

In one example, the method may also include: a content prompt message is sent to the target group member, the content prompt message for inquiring of the target group member about whether to review the message not received in the user group due to shielding.

In one example, sending a content prompt message to the target group member includes:

it is determined that the content of the new message contains an identification of the target group member or a preset correlation identification, the preset correlation identification is a preset identification related to the identification of the target group member; and the content prompt message is sent to the target group member, the content prompt message for inquiring of the target group member about whether to review the message in the user group which is not received due to shielding and which contains the identification of the target group member or the preset correlation identification.

In the example, the identification of the target group member may be a name of the target group member in the social group, for example, a group nick name in the group. The preset correlation identification of the target group member may be a previously designated identification related to the identification of the target group member. For example, it may be a real name of the target group member, or may be a user name particularly closely-followed by the target group member. The identification may be previously set or stored in the server. It should be noted that, the preset correlation identification of the identification of the target group member is not specifically limited by the present disclosure, and those skilled in the art may make replacement or alteration as desired.

In the example, the message not received by the target group member due to shielding may be selectively reviewed according to the content prompt message. In this way, while the message is shielded, the target group member may still be able to review the message. In this way, it may avoid missing some important message for the user. In addition, it is probably that the target group member may be particularly closely-followed a new message containing information related to the target group member. Therefore, by prompting the user about the shielding of the message, it may improve the user experience and avoid missing a particularly closely-followed message for the user.

It should be noted that, if it is determined that the sending party of the new message is shielded by all of the other group members than the sending party in the social group, the new message may not be sent at all. That is, the new message will not be sent to any of the other group members.

Optionally, when it is determined that the new message is related to the shielded user of the target group member, sending the new message to other group members in the user group except the target group member may also include: a content property of the new message is determined, and if the content property belongs to a preset property, the new message is sent to other group members in the user group except the target group member.

For example, in a social network, some closely-followed users often send commercial messages to a social group or a friend group. The target group member may set these users as shielded uses. However, sometimes, the target group member may only wish to shield the messages with a commercial property sent by these users, and does not wish to shield the other communication messages. In this case, after a new message is received from such user, the content of the new message may be analyzed, to determine a property of the content. If the message has a commercial property, it will be shielded and not be sent to the target group member.

It should be noted that, the determination of the property of the content may be implemented through analysis of the content of the text, which is not limited by the present disclosure. The above property of the content includes but not limited to the commercial property. Those skilled in the art may make replacement or alteration as desired.

In the method for sending a message provided by the example of the present disclosure, when a new message is received from a sending party of the new message, if the new message is related to the shielded user, the new message is not sent to the target group member, even though the new message is a group message. In this way, it may ensure the target group member does not receive a message related to the shielded user. The security of the sent message is enhanced and the user experience is improved.

Figure 2:
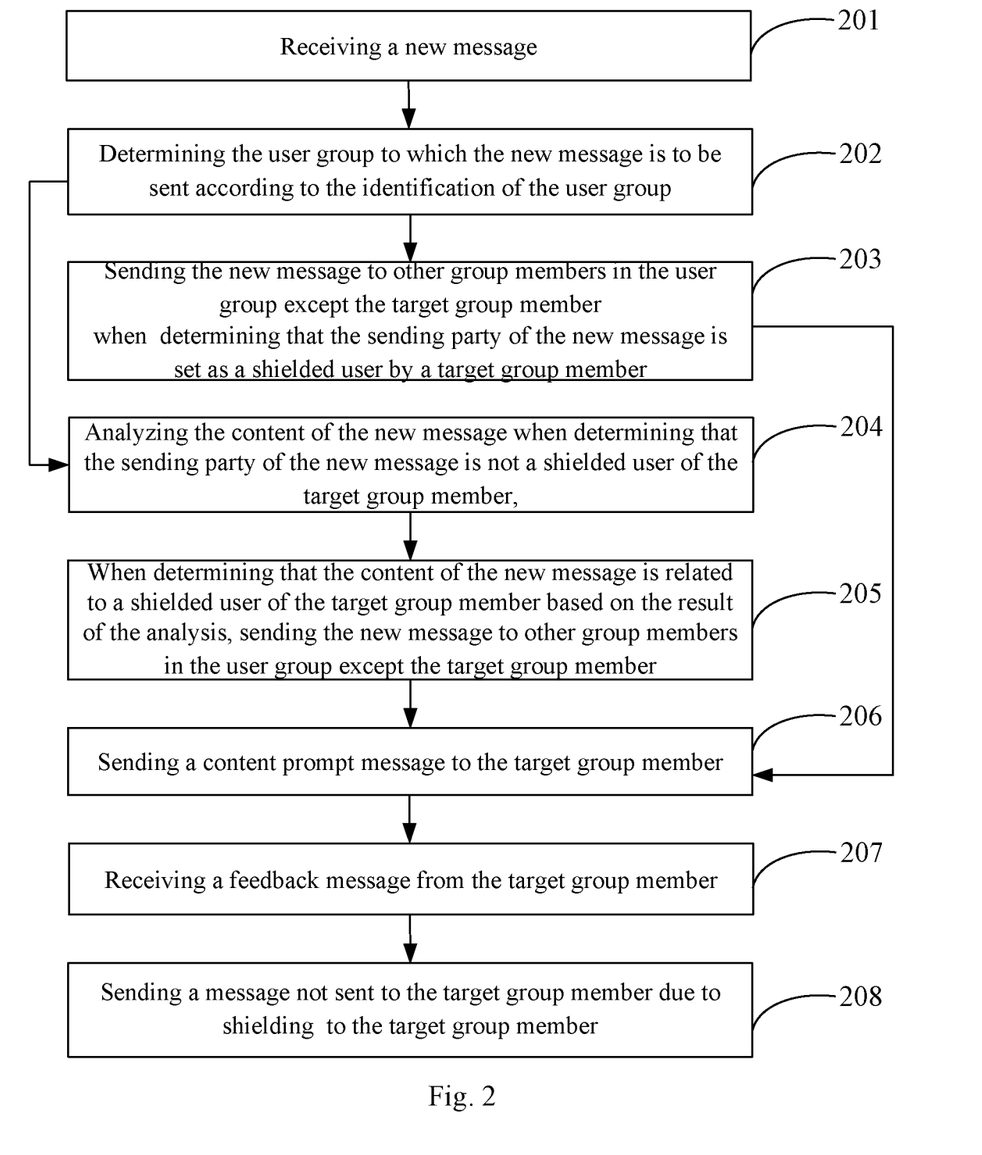
FIG. 2 is a flow chart illustrating a method for sending a message according to an example.

Based on the above method for sending a message provided by the example shown in FIG. 1, FIG. 2 is a flow chart illustrating a method for sending a message according to an example. As shown in FIG. 2, the method for sending a message provided by the example includes steps 201-208.

At step 201, a new message is received.

The new message carries an identification of a user group to which the new message will be sent.

The content of the new message may contain an identification of the target group member or a preset correlation identification, the preset correlation identification being a preset identification related to the identification of the target group member.

At step 202, a user group to which the new message is to be sent is determined according to the identification of the user group.

A user group includes at least two group members apart from the sending party of the new message, and the at least two group members includes a target group member.

The method also includes a step 203 following the step 202.

At step 203, when it is determined that the sending party of the new message is set as a shielded user by a target group member, the new message is sent to other group members in the user group except the target group member.

The method also includes a step 204 and a step 205 following the step 202.

At step 204, when it is determined that the sending party of the new message is not a shielded user of the target group member, the content of the new message is analyzed.

At step 205, when it is determined that the content of the new message is related to a shielded user of the target group member based on the result of the analysis, the new message is sent to other group members in the user group except the target group member.

The method also includes steps 206-208 following the step 203 or the step 205.

At step 206, a content prompt message is sent to the target group member.

The content prompt message is for inquiring of the target group member about whether to review the message not received in the user group due to shielding.

Further, the content prompt message may also contain an identification of the target group member or a preset correlation identification.

At step 207, a feedback message is received from the target group member.

The feedback message is for instructing that the target group member selects to review the message not received in the user group due to shielding.

At step 208, a message not sent to the target group member due to shielding is sent to the target group member.

In the method for sending a message provided by the example of the present disclosure, when a new message is received from a sending party of the new message, if it is determined that the new message is related to the shielded user of the target group member, the new message is not directly sent to the target group member, but inquiring of the target group member about whether to review the message, even though the new message is a group message. In this way, it may ensure that the target group member can selectively receive the message related to the shielded user. The security of the message is enhanced and the user experience is improved.

The following is device examples of the present disclosure, which may perform the method example of the present disclosure.

Figure 3:
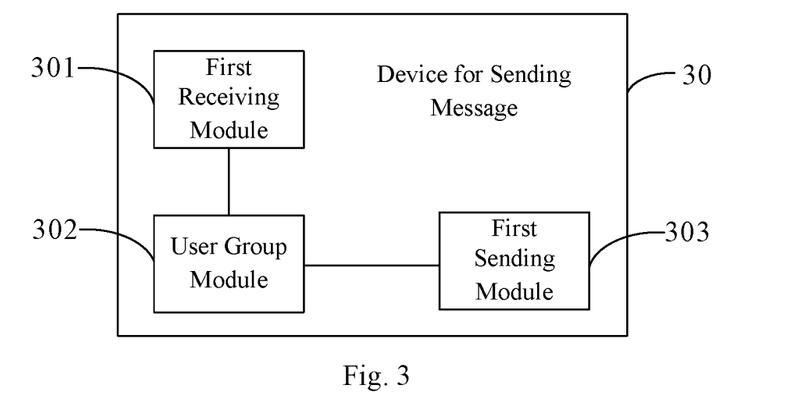
FIG. 3 is a block diagram illustrating a device for sending a message according to an example.

FIG. 3 is a block diagram illustrating a device for sending a message according to an example. The device may be implemented as a part or the whole of the device for sending a message through software, hardware or combination of the both. The device for sending a message is configured to perform the method for sending a message described in the above examples of FIGS. 1 and 2. As shown in FIG. 3, the device 30 for sending a message includes a first receiving module 301, a user group module 302 and a first sending module 303.

The first receiving module 301 is configured to receive a new message, the new message carrying an identification of a user group to which the new message is to be sent.

The user group module 302 is configured to determine the user group to which the new message is to be sent according to the identification of the user group, the user group including at least two group members apart from the sending party of the new message, and the at least two group members includes a target group member.

The first sending module 303 is configured to send the new message to other group members in the user group except the target group member upon determining that the new message is related to a shielded user of the target group member.

Figure 4:
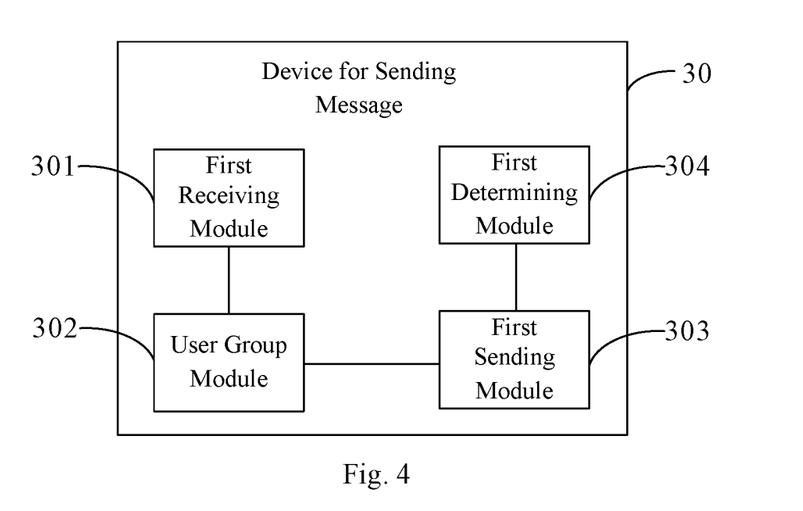
FIG. 4 is a block diagram illustrating a device for sending a message according to an example.

In an example, as shown in FIG. 4, the device 30 for sending a message also includes a first determining module 304.

The first determining module 304 is configured to determine that the new message is related to a shielded user of the target group member when determining that the sending party of the new message is set by the target group member as a shielded user.

Figure 5:
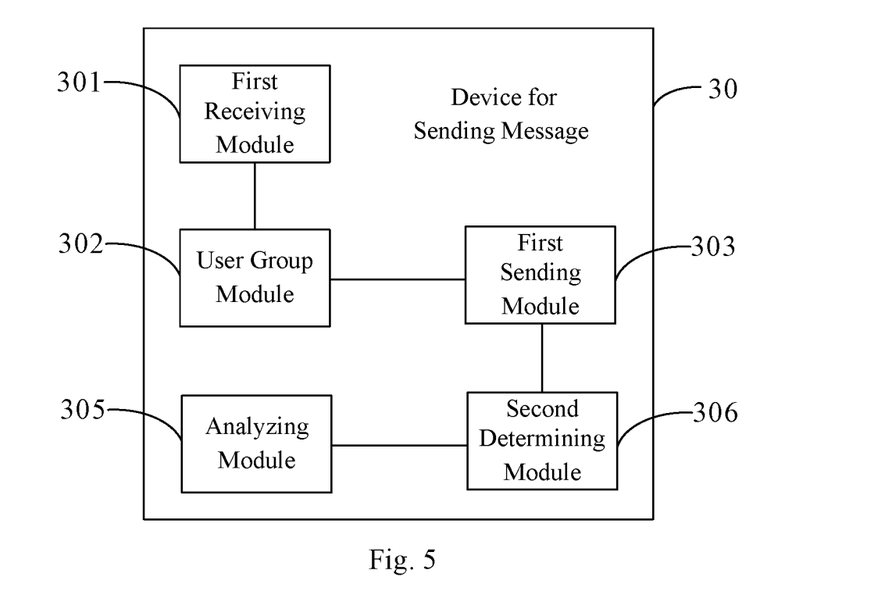
FIG. 5 is a block diagram illustrating a device for sending a message according to an example.

In an example, as shown in FIG. 5, the device 30 for sending a message also includes an analyzing module 305 and a second determining module 306.

The analyzing module 305 is configured to analyze the content of the new message The second determining module 306 is configured to determine that the new message is related to a shielded user of the target group member when determining that the content of the new message is related to a shielded user of the target group member based on the result of the analysis.

Figure 6:
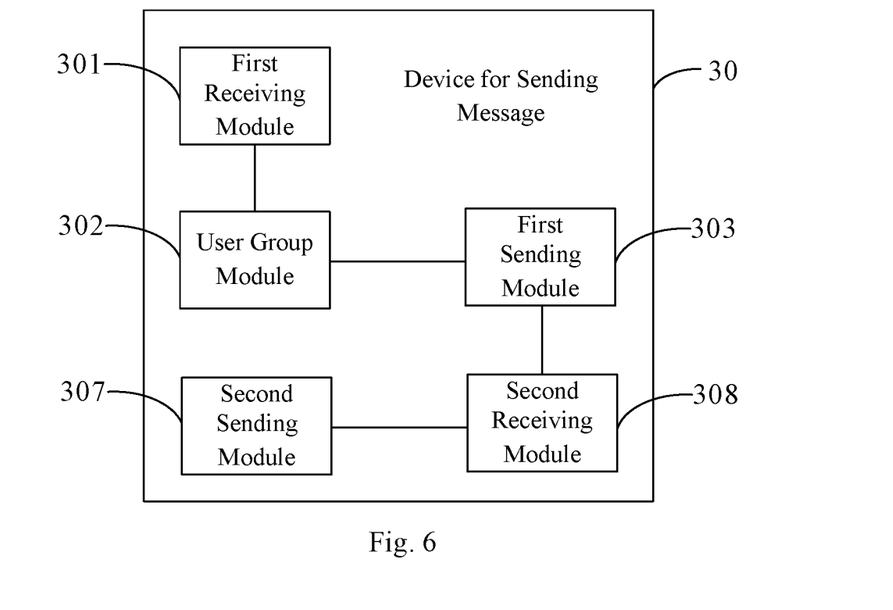
FIG. 6 is a block diagram illustrating a device for sending a message according to an example.

In an example, as shown in FIG. 6, the device 30 for sending a message also includes a second sending module 307 and a second receiving module 308.

The second sending module 307 is configured to send a shield prompt message to the target group member, the shield prompt message for inquiring of the target group member about whether to shield the message of the sending party of the new message in the user group.

The second receiving module 308 is configured to receive a confirmation message from the target group member, the confirmation message for instructing that the target group member confirms that the message of the sending party of the new message is shielded in the user group.

Figure 7:
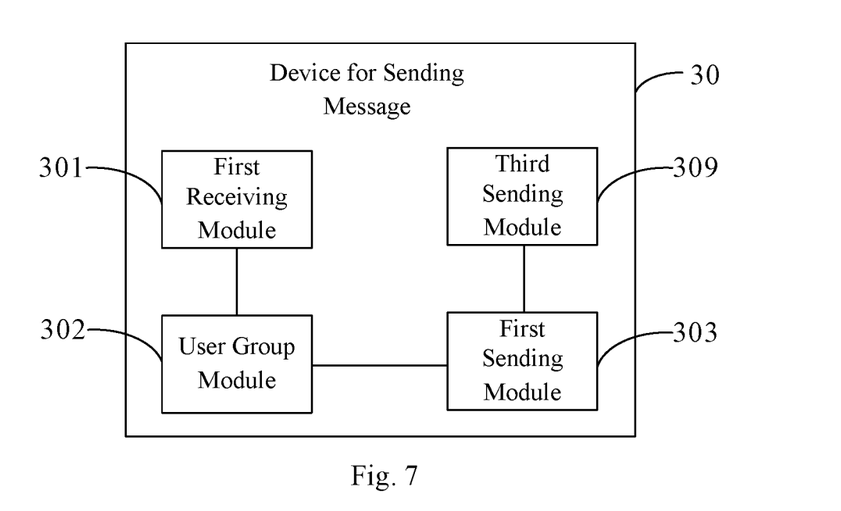
FIG. 7 is a block diagram illustrating a device for sending a message according to an example.

In an example, as shown in FIG. 7, the device 30 for sending a message also includes a third sending module 309.

The third sending module 309 is configured to send a content prompt message to the target group member, the content prompt message for inquiring of the target group member about whether to review a message not received in the user group due to shielding.

In an example, the third sending module 309 is further configured to determine that the content of the new message contains an identification of the target group member or a preset correlation identification, the preset correlation identification is a preset identification related to the identification of the target group member; and send the content prompt message to the target group member, the content prompt message for inquiring of the target group member about whether to review a message in the user group which is not received due to shielding and which contains the identification of the target group member or the preset correlation identification.

In the device for sending a message provided by the examples of the present disclosure, when a new message is received from the sending party of the new message, if it is determined that the new message is related to a shielded user of the target group member, the new message is not sent to the target group member, even though the new message is a group message. In this way, it may ensure that the target group member won't receive a group message related to the user shielded by the target group user. The security of the message is enhanced and the user experience is improved.

Hereinafter a device for sending a message is provided according to an example. The device may be implemented as a part or the whole of the device for sending a message through software, hardware or combination of the both. The device for sending a message is configured to perform the method for sending a message described in the above examples of FIGS. 1 and 2. The device for sending a message includes:

a processor; and a memory for storing instructions executable by the processor;

wherein the processor is configured to perform:

receiving a new message, the new message carrying an identification of a user group to which the new message is to be sent;

determining the user group to which the new message is to be sent according to the identification of the user group, the user group including at least two group members apart from the sending party of the new message, and the at least two group members includes a target group member; and sending the new message to other group members in the user group except the target group member upon determining that the new message is related to a shielded user of the target group member.

In an example, the processor is further configured to perform:

determining that the new message is related to a shielded user of the target group member when determining that the sending party of the new message is set by the target group member as a shielded user.

In an example, the processor is further configured to perform:

analyzing the content of the new message;

determining that the new message is related to a shielded user of the target group member when determining that the content of the new message is related to a shielded user of the target group member based on the result of the analysis.

In an example, the processor is further configured to perform:

sending a shield prompt message to the target group member, the shield prompt message for inquiring of the target group member about whether to shield the message of the sending party of the new message in the user group; and receiving a confirmation message from the target group member, the confirmation message for instructing that the target group member confirms that the message of the sending party of the new message is shielded in the user group.

In an example, the processor is further configured to perform:

sending a content prompt message to the target group member, the content prompt message for inquiring of the target group member about whether to review a message not received in the user group due to shielding.

In an example, the processor is further configured to perform:

determining that the content of the new message contains an identification of the target group member or a preset correlation identification, the preset correlation identification is a preset identification related to the identification of the target group member; and sending the content prompt message to the target group member, the content prompt message for inquiring of the target group member about whether to review a message in the user group which is not received due to shielding and which contains the identification of the target group member or the preset correlation identification.

In the device for sending a message provided by the examples of the present disclosure, when a new message is received from the sending party of the new message, if it is determined that the new message is related to a shielded user of the target group member, the new message is not sent to the target group member, even though the new message is a group message. In this way, it may ensure that the target group member won't receive a group message related to the user shielded by the target group user. The security of the message is enhanced and the user experience is improved.

Figure 8:
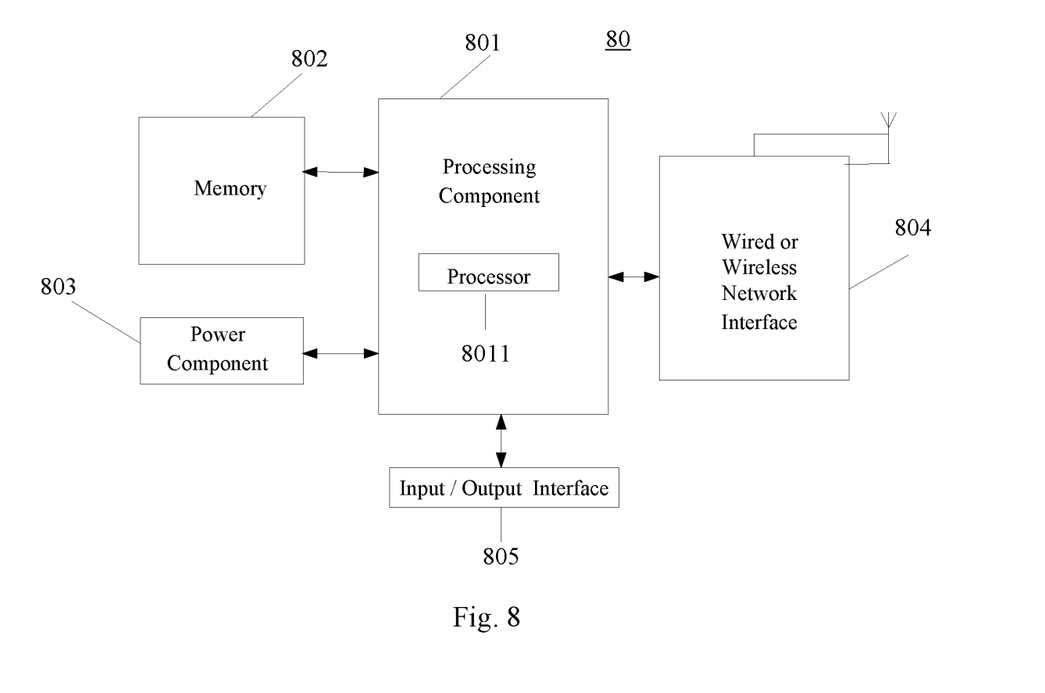
FIG. 8 is a block diagram illustrating a device for sending a message according to an example.

FIG. 8 is a block diagram illustrating another device 80 for sending a message according to an example. For example, the device 80 for sending a message includes a processing component 801 that further includes one or more processors 8011, and memory resources represented by a memory 802 for storing instructions executable by the processing component 801, such as application programs. The application programs stored in the memory 802 may include one or more modules each corresponding to a set of instructions. Further, the processing component 801 is configured to execute the instructions to perform the above described method.

The device 80 for sending a message may also include a power component 803 configured to perform power management of the device 80 for sending a message, wired or wireless network interface(s) 804 configured to connect the device 80 for sending a message to a network, and an input/output (I/O) interface 805. The device 80 for sending a message may operate based on an operating system stored in the memory 802, such as Windows Server™, Mac OS X™, Unix™, Linux™, FreeBSD™, or the like.

In an example, there is also provided a non-temporary computer readable storage medium, such as a memory 802 comprising instructions executable by the processing component 801 of the device 80 for sending a message to perform the described method for sending a message according to the examples in FIG. 1 and FIG. 2. When instructions in the storage medium is executed by the processing component 801 of the device 80 for sending a message, the device 80 for sending a message is caused to perform the method for sending a message according to the examples in FIG. 1 and FIG. 2.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

Other examples of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for securely sending a message, comprising:
   receiving, via a mobile terminal comprising a microprocessor and a network connection, a new message, the new message carrying an identification of a user group to which the new message is to be sent;
   determining, via the mobile terminal, the user group to which the new message is to be sent according to the identification of the user group, wherein the user group comprise at least two group members who are different from a sending party of the new message, and a target group member is comprised in the at least two group members;
   determining, via the mobile terminal, whether the sending party of the new message is set as a shielded user by the target group member;
   in response to determining that the sending party of the new message is the shielded user set by the target group member, directly sending, via the mobile terminal, the new message carrying the identification of the user group to the at least two group members in the user group except the target group member without analyzing content of the new message;
   in response to determining that the sending party of the new message is not the shielded user of the target group member, analyzing, via the mobile terminal, the content of the new message;
   in response to determining that the content of the new message is related to the shielded user of the target group member based on the analyzed content, determining, via the mobile terminal, that the new message is related to the shielded user of the target group member; and
   in response to determining that the new message is related to the shielded user of the target group member, sending, via the mobile terminal, the new message carrying the identification of the user group to the at least two group members in the user group except the target group member, wherein the sending party of the new message was preset by the target group member as the shielded user;
   wherein sending, via the mobile terminal, the new message carrying the identification of the user group to the at least two group members in the user group except the target group member comprises:
   determining a content property of the new message; and
   in response to determining that the content property belongs to a preset property, sending the new message to the at least two group members in the user group except the target group member.

2. The method of claim 1, prior to sending the new message to other group members in the user group except the target group member, further comprising:
   sending, via the mobile terminal, a shield prompt message to the target group member, wherein the shield prompt message inquires the target group member about whether to shield a message from the sending party of the new message in the user group; and
   receiving, via the mobile terminal, a confirmation message from the target group member, wherein the confirmation message indicates that the target group member confirms that the message from the sending party of the new message is shielded in the user group.

3. The method of claim 1, further comprising:
   sending, via the mobile terminal, a content prompt message to the target group member, wherein the content prompt message inquires the target group member about whether to review a message not received in the user group due to shielding.

4. The method of claim 3, wherein sending the content prompt message to the target group member comprises:
   determining, via the mobile terminal, that the new message contains an identification of the target group member or a preset correlation identification, wherein the preset correlation identification is a preset identification related to the identification of the target group member; and
   sending, via the mobile terminal, the content prompt message to the target group member, wherein the content prompt message contains the identification of the target group member or the preset correlation identification.

5. A device for securely sending a message, comprising:
   one or more processors;
   a network connection; and
   non-transitory computer-readable storage medium for storing instructions executable by the one or more processors;
   wherein the one or more processors are configured to:
   receive a new message, wherein the new message carries an identification of a user group to which the new message is to be sent;
   determine the user group to which the new message is to be sent according to the identification of the user group, wherein the user group comprise at least two group members who are different from a sending party of the new message, and a target group member is comprised in the at least two group members;
   determine whether the sending party of the new message is set as a shielded user by the target group member;
   in response to determining that the sending party of the new message is the shielded user set by the target group member, directly send the new message carrying the identification of the user group to the at least two group members in the user group except the target group member without analyzing content of the new message;
   in response to determining that the sending party of the new message is not the shielded user of the target group member, analyze the content of the new message;
   in response to determining that the content of the new message is related to the shielded user of the target group member based on the analyzed content, determine that the new message is related to the shielded user of the target group member; and
   in response to determining that the new message is related to the shielded user of the target group member, send the new message carrying the identification of the user group to the group members in the user group except the target group member, wherein the sending party of the new message was preset by the target group member as the shielded user;

wherein the one or more processors configured to send the new message carrying the identification of the user group to the group members in the user group except the target group member are further configured to:

determine a content property of the new message; and in response to determining that the content property belongs to a preset property, send the new message to the at least two group members in the user group except the target group member.

6. The device of claim 5, prior to sending the new message to the group members in the user group, the one or more processors are further configured to:

send a shield prompt message to the target group member, wherein the shield prompt message inquires the target group member about whether to shield a message from the sending party of the new message in the user group; and receive a confirmation message from the target group member, wherein the confirmation message indicates that the target group member confirms that the message from the sending party of the new message is shielded in the user group.

7. The device of claim 5, wherein the one or more processors are further configured to:

send a content prompt message to the target group member, wherein the content prompt message inquires the target group member about whether to review a message not received in the user group due to shielding.

8. The device of claim 5, wherein the one or more processors are further configured to send the content prompt message to the target group member are further configured to:

determine that the new message contains an identification of the target group member or a preset correlation identification, wherein the preset correlation identification is a preset identification related to the identification of the target group member; and send the content prompt message to the target group member, wherein the content prompt message contains the identification of the target group member or the preset correlation identification.

9. A non-transitory computer-readable storage medium having stored therein instructions for securely sending a message, wherein the instructions, when executed by one or more processors of a mobile terminal further comprising a network connection, cause the mobile terminal to:

receive a new message, wherein the new message carries an identification of a user group to which the new message is to be sent;

determine the user group to which the new message is to be sent according to the identification of the user group, wherein the user group comprises at least two group members who are different from a sending party of the new message, and a target group member is comprised in the at least two group members;

determine whether the sending party of the new message is set as a shielded user by the target group member;

in response to determining that the sending party of the new message is the shielded user set by the target group member, directly send the new message carrying the identification of the user group to the at least two group members in the user group except the target group member without analyzing content of the new message;

in response to determining that the sending party of the new message is not the shielded user of the target group member, analyze the content of the new message;

in response to determining that the content of the new message is related to the shielded user of the target group member based on the analyzed content, determine that the new message is related to the shielded user of the target group member; and in response to determining that the new message is related to the shielded user of the target group member, send the new message to the group members in the user group except the target group member, wherein the sending party of the new message was preset by the target group member as the shielded user;

the instructions causing the mobile terminal to, send the new message to the group members in the user group except the target group member further cause the mobile terminal to:

determine a content property of the new message; and in response to determining that the content property belongs to a preset property, send the new message to the at least two group members in the user group except the target group member.

10. The non-transitory computer-readable storage medium according to claim 9, wherein, prior to sending the new message to the group members in the user group, the instructions further case the mobile terminal to:

send a shield prompt message to the target group member, wherein the shield prompt message inquires the target group member about whether to shield a message from the sending party of the new message in the user group; and receive a confirmation message from the target group member, wherein the confirmation message indicates that the target group member confirms that the message from the sending party of the new message is shielded in the user group.

11. The non-transitory computer-readable storage medium according to claim 9, wherein the instructions further case the mobile terminal to:

send a content prompt message to the target group member, wherein the content prompt message inquires the target group member about whether to review a message not received in the user group due to shielding.

12. The non-transitory computer-readable storage medium according to claim 11, wherein the instructions further case the mobile terminal to send the content prompt message to the target group member further cause the mobile terminal to:

determine that the new message contains an identification of the target group member or a preset correlation identification, wherein the preset correlation identification is a preset identification related to the identification of the target group member; and send the content prompt message to the target group member, wherein the content prompt message contains the identification of the target group member or the preset correlation identification.

* * * * *